United States Patent [19]

Quamme et al.

[11] Patent Number: 4,558,080

[45] Date of Patent: Dec. 10, 1985

[54] STABLE TANNIN BASED POLYMER COMPOUND

[75] Inventors: Jane E. Quamme, Chicago; Anne H. Kemp, Palatine, both of Ill.

[73] Assignee: Dearborn Chemical Company, Lake Zurich, Ill.

[21] Appl. No.: 573,353

[22] Filed: Jan. 24, 1984

[51] Int. Cl.$^4$ .................. C08L 97/00; C08L 99/00; C08K 5/13
[52] U.S. Cl. .................. 524/72; 210/723; 210/728; 524/73; 528/129; 528/137; 528/230; 528/232
[58] Field of Search ............ 528/230, 232, 129, 137, 528/269; 560/68; 524/72, 73; 210/723, 728

[56] References Cited

U.S. PATENT DOCUMENTS

| | | | |
|---|---|---|---|
| 598,914 | 2/1898 | Dürkopf | 528/137 |
| 2,801,986 | 8/1957 | Meister | 528/129 |
| 2,955,012 | 10/1960 | Küntzel et al. | 528/269 X |
| 3,254,038 | 5/1966 | Duncan et al. | 528/129 X |
| 3,872,000 | 3/1975 | Hamada et al. | 528/230 X |

FOREIGN PATENT DOCUMENTS 899721 6/1962 United Kingdom .

OTHER PUBLICATIONS

"Condensed Tannins for Adhesives", Ind. Eng. Chem. Prod. Res. Dev. 1982, 21, pp. 359–369, Antonio Pizzi.

*Primary Examiner*—Lucille M. Phynes
*Attorney, Agent, or Firm*—Edward J. Cabic

[57] ABSTRACT

An aqueous flocculant solution containing a tannin based polymer compound is produced which is stable and has a shelf life of at least 3–6 months before gelling. The solution is made by reacting at a temperature of from 150°–200° F. a tannin, an amino compound, and an aldehyde under slightly acidic conditions where the pH is less than 7 and where the molar ratio of the primary amine from the amino compound to the tannin repeating unit is from about 1.5:1 to 3.0:1. The intermediate viscosity of the reaction mixture is monitored until the reaction mixture has an intermediate viscosity within the range of the system key intermediate viscosity range. This system key intermediate viscosity range is previously determined for each reactant system to be employed. It is a narrow intermediate viscosity range that is experimentally determined which permits the resulting product to have a long shelf life. The narrow system key intermediate viscosity range will generally be within the range of from about 2–100 cps when measured at 180° F. on a Brookfield LVT viscometer. When this viscosity is reached, the reaction is terminated and the solids content of the liquid is adjusted to about 20% to 60% by weight and the pH is adjusted to a value of less than 3.0.

24 Claims, No Drawings

STABLE TANNIN BASED POLYMER COMPOUND

BACKGROUND OF THE INVENTION

1. Field of the Invention

This invention relates to a process for the manufacture of a tannin based polymer flocculant which does not gel and which remains stable over a period of several months.

2. Description of the Previously Published Art

British Pat. No. 899,721 discloses a process for flocculation of suspensions such as sewage, industrial waste and natural water in which a flocculating agent is applied comprising the reaction product between a tannin, formaldehyde and an amino or ammonium compound. This patent is directed to the new use of this reaction product and provides no detailed discussion of how the reaction product is to be formed nor does it provide any example of making the reaction product. The disclosed advantage of using the flocculating agent is that it does not effect the pH of the suspension solution and that the flocculating agents do not affect the dissolved inorganic solids content of the final water.

Merely reacting these three ingredients disclosed in the British patent forms a reaction product which tends to form a gel; it does not remain in the liquid form for substantial periods of time.

3. Objects of the Invention

It is an object of this invention to produce a tannin based polymer flocculant which will not gel or solidify over a period of several months.

It is a further object of this invention to react tannin, an amino compound and an aldehyde to form a flocculant which is made under such controlled reaction conditions that a high solids flocculant is obtained which does not gel or solidify over a period of several months.

It is a further object of this invention to produce a tannin based polymer flocculant which when used in water purification and demulsification and which continues to provide commercially acceptable performance after being stored for relatively long periods of time.

It is a further object of this invention to produce a tannin based polymer flocculant which is made by monitoring the intermediate viscosity of the reaction product so as to obtain a final product with a long shelf life.

It is a further object of this invention to treat wastewater by adding this unique tannin based polymer flocculant which has a long shelf life.

These and further objects will become apparent as the description of the invention proceeds.

SUMMARY OF THE INVENTION

An aqueous solution of a tannin based polymer compound which is suitable for use as a flocculant is made under controlled reaction conditions. We have discovered that the key to obtaining a successful commercial product which has a shelf life of at least 3 months under ambient conditions is the ability to monitor the reaction and stop it when the viscosity reaches a critical intermediate range. An aqueous reaction mixture is formed of a tannin, an amino compound, and an aldehyde under slightly acidic conditions where the pH is less than 7 and where the molar ratio of the primary amine from the amino compound to the tannin repeating unit is from about 1.5:1 to 3.0:1. The reaction mixture is heated at a temperature of from about 150°–200° F. until a reaction product forms which has an intermediate viscosity within the desired range which is referred to as the system key intermediate viscosity range. This system key intermediate viscosity range is determined for each reactant system to be used. It is a narrow intermediate viscosity range that is experimentally determined which permits the resulting product to have a long shelf life. These narrow system key intermediate viscosity ranges will generally be within the range of from about 2–100 cps when measured at 180° F. on a Brookfield LVT viscometer. The reaction is terminated when the system key intermediate viscosity has been reached. The solids content of the liquid is adjusted to about 20 to 60% by weight and the pH is adjusted to a value of less than 3.0 to form a stable final product.

In a preferred embodiment using tannin in the form of a spray-dried quebracho powder, formaldehyde and monoethanol amine, the system key intermediate viscosity range is from about 38–40 cps when measured at 180° F. on a Brookfield LVT viscometer. The reaction liquid is cooled and adjusted to have a solids content from about 40 to 45% by weight and a pH preferably in the range of 2.3 to 2.6. This aqueous solution remains stable and does not gel for up to six months and it can be used as a flocculant for treating wastewater.

DESCRIPTION OF THE PREFERRED EMBODIMENTS

The tannin based polymer compound is made by reacting together three components under slightly acidic pH conditions.

The tannin component can be obtained from the various wood and vegetation materials found throughout the world. Tannins are a large group of water-soluble, complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho, chestnut, oak and urunday. Examples of fruits are myrobalans, valonia, divi-divi, tara, and algarrobilla. Examples of leaves are sumac and gambier and examples of roots are canaigre and palmetto. Among the preferred materials are the quebracho wood. A spray-dried quebracho powder is sold by Canada Packers, Ltd. as Mimosa Extract.

These natural tannins can be categorized into the traditional "hydrolyzable" tannins and "condensed tannins" as disclosed by A. Pizzi in "Condensed Tannins for Adhesives", *Ind. Eng. Chem. Prod. Res. Dev.* 1982, 21, 359–369. Condensed tannin extracts are those manufactured from the bark of the black wattle tree (or mimosa tannin of commerce), from the wood of the quebracho tree (Spanish: Quebra hacha, axe-breaker,) from the bark of the hemlock tree, and from the bark of several commonly used pine species. The preparation of wattle and quebracho extracts is a well established industrial practice and they are freely available in considerable amounts.

Condensed tannin extracts, such as wattle and quebracho, are composed of approximately 70% polyphenolic tannins, 20% to 25% nontannins, mainly simple sugars and polymeric carbohydrates (hydrocolloid gums), the latter of which constitute 3% to 6% of the extract and heavily contribute to extract viscosity, while the balance is accounted for by a low percentage of moisture. Although the exact structure is not known, it is believed that the main polyphenolic pattern in quebracho tannins is represented by flavonoid analogues based on resorcinol A and pyrogallol B rings as shown in Formula I below:

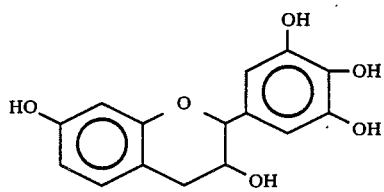

The second component is an aldehyde. Examples of preferred materials are formaldehyde which can be used in the form of a 37% active formaldehyde solution. This is also commercially available as formalin which is an aqueous solution of 37% formaldehyde which has been stabilized with from 6–15% methanol. Other commercial grades of formaldehyde and its polymers could be used. Such commercial grades include 44, 45 and 50% low-methanol formaldehyde, solutions of formaldehyode in methyl, propyl, n-butyl, and isobutyl alcohol, paraformaldehyde and trioxane. When using solid paraformaldehyde, care must be taken that it all dissolves.

Other aldehyde containing or generating reactants are organic chemical compounds which contain at least one aldehyde group therein as are well known and include, for example, formaldehyde, acetaldehyde, propionaldehyde, glycolaldehyde, glyoxylic acid and the like or polyaldehydes i.e., organic compounds having more than one aldehyde group in the compound, such as glyoxal, paraformaldehyde and the like. Other suitable aldehyde reactants include aldehyde generating agents i.e. known organic compounds capable of forming an aldehyde group in situ, such as melamine-formaldehyde monomeric products and derivatives such as tri and hexa(methylol) melamine and the tri and hexa ($C_1$-$C_3$ alkoxymethyl)melamine. Such materials can be formed by known conventional methods. The alkyl blocked derivatives are commercially available, are stable to self polymerization and are, therefore, preferred.

The third component for the reaction product is an amino compound such as ammonia or a primary or secondary amine or amide compound. Preferred materials include primary amines such as monoethanolamine, methylamine and ethylamine. The primary amines are preferred since they are the more reactive amines than secondary or tertiary amines.

In reacting these three components it is necessary to do this under very controlled conditions and especially under a slight acidic condition where the pH is less than 7. Any acid can be used to obtain this condition and especially preferred are muriatic acid and acetic acid.

A further preferred material to be used in the reaction is an antifoamer material to prevent any foaming from taking place. Examples of these materials are silicon anti-foamers such as Silicone B made by Dow Chemical Co. Mineral seal oil and high molecular weight alcohols can also be used.

The product obtained is believed to consist of a polymeric substance which has been modified by a "Mannich" reaction. In the Mannich reaction an aldehyde is condensed with an amino compound and an active hydrogen supplied by the polyphenolic tannin. Although the structure of tannin is not completely known, it is believed the reaction product can be approximated by the following recurring structure:

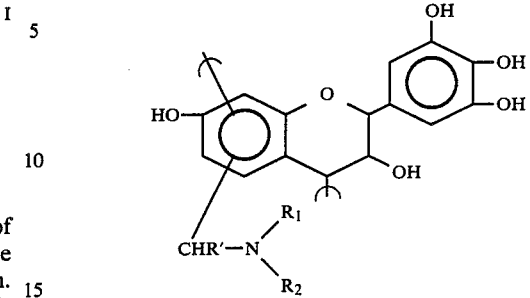

where
CHR' is the remainder of the aldehyde compound after the carbonyl oxygen has left and
$R^1$ and $R^2$ are hydrogen or other organic moieties that were part of the original amino compound.

According to this model the molecular weight of a repeating tannin unit is assumed to be approximately 300. The preferred molar ratio of the primary amine to the tannin repeating unit is in the range of about 1.5:1 to 3.0:1.

As the reaction between the three ingredients proceeds under heated conditions, the extent of the reaction is controlled by monitoring the viscosity of the reaction mixture which we call the intermediate viscosity. We have found that for any given reactant system involving these three components there is a relatively narrow range of intermediate viscosity which determines the end point of the reaction. We refer to this range as the system key intermediate viscosity range. Once this range is reached, the reaction should be terminated by quenching and rapid external cooling. We have found this intermediate viscosity has an effect on the final viscosity of the product at room temperature which in turn will affect the stability or shelf life of the product. By carefully controlling the intermediate viscosity for each given reactant system, the resultant product can be produced which has a long shelf life.

In one embodiment where tannin is mixed with an amino compound such as monoethanolamine, it is desirable to also add an antifoam material after dissolving the tannin in the water. The pH is maintained slightly acidic by adding an acid such as hydrochloric acid. After this initial addition takes place, it is preferable to cool the material down and to then add the aldehyde such as formaldehyde so the reaction mixture is at a temperature of approximately 120°–130° F. Although the reaction is exothermic, it is preferred to add additional heat to maintain the reaction temperature at about 150°–200° F. and more preferably at about 180° F.

If the reaction temperature is lower than about 150° F., the final product does not have a high activity and it is less effective. If the reaction temperature is much higher than about 200° F., then the product ages too quickly and tends to gel and not have the desired long shelf life.

The extent of reaction is monitored by checking the viscosity. When the viscosity of this reaction mixture at 180° F. reaches a level of 38–40 centipoises, then the reaction is rapidly stopped. This is preferably done by using external cooling and by quenching the reaction mixture by adding water and additional acid so that the solids content is in the range of 40–45 wt. % and the pH is in the range of 2.3–2.6. By controlling the reaction so that it only proceeds to an intermediate viscosity of 38–40 cps (when measured at 180° F.) an excellent product using these reactants is obtained which will have the desired long shelf life of 4 to 6 months.

If the reaction is quenched earlier at a lower intermediate viscosity, the final product is a less effective flocculant. Thus, the lower the intermediate and the subsequent final viscosity, the less effective will be the product. For example, a product with a final viscosity at 135.8 cps was added in 700 ppm to flocculate a 500 ppm humic acid solution, the resulting supernatant had a poor transmittance of 73%. However, the product according to the present invention as described in Example 1 with its final viscosity of 246 cp was able to achieve a much better 90% supernatant transmittance at the same dosage of 700 ppm.

If the reaction mixture for the reactants described above is quenched at a higher intermediate viscosity than 38–40 cps, the product does not remain liquid for the desired 4–6 months. For example, when a product is made from these reactants with a high intermediate viscosity which is greater than approximately 40 cps, the final product has a shelf life less than 4 months.

Thus, by varying the intermediate viscosity for each given reactant system and determining the effective shelf life, one can obtain a narrow range for the system key intermediate viscosity as has been done above. For the above-described system the system key intermediate viscosity range is from about 38–40 cps. For other systems with other reactants we expect that the system key intermediate viscosity ranges will be within the range of 2–100 cps when measured at 180° F. on a Brookfield LVT viscometer.

The mole ratio of the primary amine to tannin repeating unit should be controlled. We focus on the primary amine content since this is the one that is the most reactive and it will readily take part in the Mannich reaction. Although secondary amines are operable and can be used, we much prefer primary amines and the following discussion will be in terms of these preferred primary amines. Assuming a repeating tannin unit with a molecular weight of 300 based on the polyphenolic constituent illustrated in Formula I above, the monoethanolamine to tannin repeating unit ratio of this embodiment is preferably about 1.7:1 to 2.0:1 and more preferably about 1.86:1 as illustrated by the reaction in Example 1. Reactions were run identically to the procedure in Example 1 except that the monoethanolamine addition was increased so that the resulting primary amine: tannin ratio was in the range of 2.0–2.5:1. In Table 1 below are the results of a flocculating test using 500 ppm of a standard humic acid solution. The higher the transmittance of the resulting supernatant, the better is the flocculant.

TABLE 1

| Amine:Tannin Mole Ratio | ppm Product Added to a 500 ppm Humic Acid Solution | % Transmittance of Supernatant |
| --- | --- | --- |
| 1.86:1 | 700 | 90 |
| 2.00:1 | 700 | 84 |
| 2.25:1 | 700 | 81 |
| 2.50:1 | 700 | 73 |

The data in Table 1 shows the less effective flocculant obtained when the primary amine:tannin ratio is increased above the desired level of 2.0:1. If the primary amine:tannin ratio is below the preferred lower value of about 1.7:1, then the reaction product ages too quickly to be a useful, commercial product.

After the product has been made, the pH of the liquid should be adjusted to provide a long product shelf life. We have found that the higher the final product viscosity, the shorter will be the shelf life. In Table 2 below are the final product viscosities in centipoises when measured at 75° F. for product liquids made by the procedure in Example 1 and which have been adjusted to various pHs.

TABLE 2

| Final Product pH | Final Product Viscosity (cps) |
| --- | --- |
| 1.0 | 350 |
| 2.0 | 200 |
| 2.5 | 150 |
| 3.0 | 325 |
| 5.0 | 450 |
| 7.0 | 2,350 |
| 9.0 | 16,000 |
| 11.0 | greater than 20,000 |

From the data in Table 2 it is seen that the pH of the final product should be maintained at a value of less than 3.0 and we have found an even more preferably range of from about 2.3 to 2.6 for the products produced by the first embodiment procedure.

The desired final product is a liquid which has a viscosity of less than 20,000 cps. If the viscosity over a relatively short period of time increases above 20,000 cps, then it is indicative that the material has formed an undesirable gel which will not perform in a commercially acceptable manner. Eventually, all products made by reacting tannin with an amino compound and an aldehyde will increase in viscosity over time and finally gel.

In summary, the reaction should be conducted at an acid pH of less than 7.0, the primary amine to tannin repeating unit molar ratio should be from 1.5–3.0:1, the intermediate viscosity should be monitored and the reaction stopped when the narrow range is reached which will be uniquely determined for each reactant system and which we refer to as the system key intermediate viscosity range, and the pH for the final product should be adjusted to a value of less than 3.0 and more preferably 1.7–2.6. By following this procedure a tannin based polymer compound is produced which has a shelf life of greater than 3 months at ambient conditions.

In another embodiment for producing the tannin based polymer compound it is possible to first react an aldehyde such as formaldehyde with an amino compound such as ammonium chloride to generate a primary amine compound in situ. Here the amines produced are a mixture of mono-, di-, and trimethylamines. A silicone antifoam material is added and with stirring the reaction mixture is heated to about 140° F. for three hours. The material is then refluxed at a higher temperature of around 183° F. where it is maintained for an additional 3 hours. The amount of the desired primary reactive amine here is controlled by the reaction time. The longer the reaction time the less primary amine will be present in the solution because the less active secondary and tertiary amines will be formed. After this initial reaction has taken place, the reaction mixture can be cooled to a level of about 130° F. for subsequent mixing with the tannin compound. Note that because of the by-product acid produced when ammonium chloride reacts with the aldehyde, there is no need to add any additional acid to the reaction mixture to achieve the desired acid pH conditions.

In this second embodiment the tannin compound can be prepared in a separate reactor by mixing tannin with water and a silicone antifoaming agent. A preferred form of the tannin is a spray dried quebracho powder, sold as Mimosa Extract by Canadian Packers, Ltd. After the tannin has been dissolved in the water at a relatively high temperature of 176°–194° F. the aqueous tannin mixture is cooled to approximately 130° F. The methylamine/formaldehyde reaction mixture is added to the aqueous tannin mixture and the reaction is heated to about 183° F. The reaction is continued until the intermediate viscosity reaches the range of about 4–15 cps.

Upon achieving the desired extent of reaction, the mixture is quenched to room temperature by external cooling and the addition of water which adjusts the solids content in the range of about 28–32%. Since the acid producing ammonium chloride was used as the amino forming compound, it produced an acidic condition with a pH of about 1.7–2.6. Thus it is not necessary in this case to add any additional acid to adjust the final pH of the solution.

A standard test for flocculating activity is to add humic acid to water in a controlled amount and to then add the proposed flocculating agent. The agent should precipitate the humic acid and leave a supernatent liquid which is clear. The degree of transmittance of light through the supernatant is measured and serves as an indicator of the effectiveness of the flocculating agent. The higher the transmittance, the more effective is the flocculating agent. Results of this test for the reaction products according to the present invention are set forth in Example 4.

Having described the basic aspects of our invention, the following examples are give to illustrate the specific embodiments thereof.

EXAMPLE 1

In this example the tannin based polymer compound was produced by using monoethanolamine as the amino compound and formaldehyde as the aldehyde.

A reactor containing 130.75 grams of deionized water was preheated to 150° F. Gradually 125.75 grams of Momosa Extract which is a spray-dried quebracho powder sold by Canadian Packers, Ltd. was gradually added while stirring. The temperature was maintained at about 130°–140° F. After complete dissolution, the material was cooled to 110° F. Then 0.15 gram of the silicon antifoam Silicone B made by Dow Chemical was added.

To the aqueous tannin solution 47.65 grams of monoethanolamine were added to yield a primary amine to tannin ratio fo 1.86:1 while mixing and the temperature of the reaction mixture was allowed to rise to 130° F. and it was maintained at this temperature until all of the amine was added. In order to maintain the acid conditions of the reaction mixture 80.0 grams of a 32% active hydrochloric acid was added to bring the pH in the range of 6.4 to 6.7 and the temperature was allowed to rise to 140° F. Upon forming this initial tannin/amine solution, the mixture was then cooled to 120° F.

Next, formaldehyde was added in the form of 62.70 grams of 37% active formaldehyde and the temperature during this addition was maintained between 120° and 130° F. As the formaldehyde was mixed with the previous solution the solution was heated to initiate the reaction. The temperature was controlled so that it was not allowed to go above about 180° F. As the reaction proceeded, the viscosity of the solution was monitored using a Brookfield LVT viscometer where the samples were measured at a temperature of about 178°–180° F. When the viscosity reading reached 38–40 cps, the desired degree of reaction was obtained. At this point the reaction material was quenched by the addition of external cooling and 45.20 grams of deionized water and 7.8 grams of muriatic acid to obtain a final pH of 2.4 and to obtain a solids content of about 40.2% and a final viscosity of 246 cps.

The reaction product obtained was stored at ambient conditions and after six months it was still in a liquid form and it had not gelled or solidified.

EXAMPLE 2

A reactor was charged with 173.7 grams of 37% active formaldehyde, 38.50 grams of ammonium chloride and 0.07 grams of Silicon B, a silicone antifoamer made by Dow Chemical Company. The reactor was equipped with an efficient condenser, but not under pressure and the temperature was slowly brought up to 140° F. while stirring and this condition was maintained for 3 hours. Then the temperature was further increased to reflux conditions at a temparature of approximately 183° F. and reflux wais maintained for an additional 3 hours. The initial reaction product consists of mono-, di-, and tri-methylamines. The mixture was allowed to cool to below 130° F. so it could be subsequently added to an aqueous tannin mixture.

The aqueous tannin mixture was prepared in a separate stirred reactor by first preheating 104.85 grams of deionized water to 176°–194° F. To this stirred reactor 0.07 grams of the silicone antifoam was added along with 86.65 grams of Mimosa Extract which is a spray-dried quebracho powder. After the tannin material had dissolved in the water the reactor was cooled to below 130° F. Then the methylamine/formaldehyde solution obtained in the first reactor was slowly added to this aqueous tannin solution and the mixture was heated to about 185° F. The reactor is maintained at this temperature until the intermediate viscosity reached approximately 5.3 cps as measured by a Brookfield LVT viscometer at 185° F. After the desired intermediate viscosity was obtained, the reaction mixture was quenched by cooling it to room temperature and by adding 96.15 grams of deionized water which adjusted the solids content in the range of 28–32 weight percent.

The final reaction product had a solids content of 29.4%, a viscosity of 20 cps at room temprature and a pH of 1.9. It has been stored at ambient conditions for over five months without gelling or solidifying.

EXAMPLE 3

The reaction products according to the present invention as made in Examples 1 and 2 were tested along with other flocculants such as alum and ferric chloride ($FeCl_3$) in the treatment of river water to remove solids. The water employed was from the Yadkin River. The results are set forth in Table 3

TABLE 3

| Treatment | Dosage (ppm) | Turbidity (NTU) | Color (APHA UNITS) |
|---|---|---|---|
| None - Control | — | 17 | 50 |
| Alum | 1 | 14 | 20 |

TABLE 3-continued

| Treatment | Dosage (ppm) | Turbidity (NTU) | Color (APHA UNITS) |
|---|---|---|---|
| FeCl$_3$ | 1 | 17 | 30 |
| Example 1 | 6.8 | 8 | less than 1 |
| Example 2 | 9.6 | 7 | 2 |

The data in Table 3 shows that the products made according to the present invention substantially reduce the turbidity (in nephelometric turbidity units) from 17 down to 7 or 8. Similarly, the color in APHA (American Public Health Association) units (which are based on a Pt-Co standard) is reduced from 50 to 2 and lower.

EXAMPLE 4

The reaction products according to the present invention as made in Examples 1 and 2 were tested to remove humic acid from water. The humic acid was present in an amount of 500 ppm. The results are set forth in Table 4.

TABLE 4

| Treatment | Product Dosage (ppm) | % Transmittance of Wastewater Supernatant |
|---|---|---|
| None | — | 0 |
| Example 1 | 500 | 71 |
|  | 800 | 90 |
|  | 1000 | 90 |
| Example 2 | 500 | 73 |
|  | 800 | 93 |
|  | 1000 | 95 |

The data in Table 4 illustrates the significant flocculating effect obtained by these reaction products in removing the humic acid from the water at relatively low concentrations.

It is understood that the foregoing detailed description is given merely by way of illustration and that many variations may be made therein without departing from the spirit of this invention.

What is claimed is:

1. A method of forming an aqueous solution of a tannin based polymer compound suitable for use as a flocculant comprising the steps of
   (a) forming an aqueous reaction mixture of a tannin, an amino compound, and an aldehyde under slightly acidic conditions where the pH is less than 7 and where the molar ratio of the primary amine from the amino compound to the tannin repeating unit is from about 1.5:1 to 3.0:1;
   (b) heating the reaction mixture at a temperature of from about 150°–200° F. until the reaction product forms which has an intermediate viscosity within the range of the system key intermediate viscosity range, said system key intermediate viscosity range being determined for each reactant system as the narrow intermediate viscosity range which permits the resulting product to have a long shelf-life, said system key intermediate viscosity range being within the range of from about 2–100 cps when measured at 180° F. on a Brookfield LVT viscometer, and
   (c) terminating the reaction when the intermediate viscosity has reached the condition specified in step (b) and adjusting the solids content of the liquid to about 20 to 60% by weight and adjusting the pH to a value of less than 3.0.

2. The method according to claim 1, wherein the amino compound is monoethanolamine.

3. The method according to claim 1, wherein the aldehyde is formaldehyde.

4. The method according to claim 3, wherein the amino compound is monoethanolamine.

5. The method according to claim 1, wherein the temperature in step (b) is about 175°–185° F.

6. The method according to claim 1, wherein the amino compound is an amine and the primary amine to tannin repeating unit molar ratio is from about 1.7:1 to 2.0:1.

7. The method according to claim 1, wherein the tannin is provided in the form of a quebracho powder.

8. The method according to claim 7, wherein the amino compound is monoethanolamine and the aldehyde is formaldehyde.

9. The method according to claim 8, wherein the reaction temperature is about 175°–185° F., the intermediate viscosity is about 38–40 cps, the final solids content is about 35 to 45 weight % and the pH is about 1.7 to 2.6.

10. The method according to claim 9, wherein the solids content in step (c) is adjusted to about 40 to 45% by weight.

11. The method according to claim 9, wherein the pH of the reaction product in step (c) is adjusted to about 2.3 to 2.6.

12. The product made by the process of claim 1.

13. The product made by the process of claim 9.

14. The method according to claim 1, wherein the amino compound is selected from the group consisting of methylamine, dimethylamine, trimethylamine, and mixtures thereof.

15. The method according to claim 14, wherein the reaction temperature is about 175°–185° F., the intermediate viscosity is about 4–15 cps, the final solids content is about 38–32 weight percent and the pH is about 1.7 to 2.6.

16. The method according to claim 15, wherein the pH is about 1.9.

17. The product made by the process of claim 14.

18. The product made by the process of claim 15.

19. A stable aqueous solution of a tannin based polymer compound formed by reacting tannin, an amino compound and an aldehyde under slightly acidic conditions where the pH is less than 7, said solution having a solids content of 20 to 60% by weight, a pH of less than 3, and having a stable shelf life such that it remains a liquid and does not gel at ambient conditions for at least 3 months.

20. In a process of treating wastewater by the addition of a flocculant, the improvement wherein the flocculant is the aqueous solution of a tannin based polymer compound of claim 19.

21. In a process of treating wastewater by the addition of a flocculant, the improvement wherein the flocculant is the aqueous solution of a tannin based polymer compound of claim 12.

22. In a process of treating wastewater by the addition of a flocculant, the improvement wherein the flocculant is the aqueous solution of a tannin based polymer compound of claim 13.

23. In a process of treating wastewater by the addition of a flocculant, the improvement wherein the flocculant is the aqueous solution of a tannin based polymer compound of claim 17.

24. In a process of treating wastewater by the addition of a flocculant, the improvement wherein the flocculant is the aqueous solution of a tannin based polymer compound of claim 18.

* * * * *